United States Patent [19]

Lawrenz

[11] Patent Number: 5,179,527
[45] Date of Patent: Jan. 12, 1993

[54] OPTIMIZER FOR A PARAMETER-DEPENDENT NETWORK SYSTEM

[76] Inventor: Wolfhard Lawrenz, Waldweg 1, 3340 Wolfenbuettel, Fed. Rep. of Germany

[21] Appl. No.: 441,003

[22] Filed: Nov. 24, 1989

[30] Foreign Application Priority Data

Nov. 24, 1988 [DE] Fed. Rep. of Germany ....... 3839675

[51] Int. Cl.⁵ ............................................. G05B 13/04
[52] U.S. Cl. .................................. 364/578; 364/149; 364/165
[58] Field of Search .............. 364/578, 149, 151, 165, 364/514, 133

[56] References Cited

U.S. PATENT DOCUMENTS

| | | | |
|---|---|---|---|
| 3,828,171 | 8/1974 | Griffin | 364/151 |
| 4,628,462 | 12/1986 | Putman | 364/149 |
| 4,639,853 | 1/1987 | Rake et al. | 364/151 |
| 4,707,832 | 11/1987 | Glenn et al. | 370/124 |
| 4,766,552 | 8/1988 | Aalbu et al. | 364/149 |
| 4,771,391 | 9/1988 | Blasbalg | 364/517 |

Primary Examiner—Parshotam S. Lall
Assistant Examiner—Ellis B. Ramirez
Attorney, Agent, or Firm—Foley & Lardner

[57] ABSTRACT

In a parameter-dependent control system, comprising at least one controller, from at least one input value, taking into account at least one parameter, and a controlled system, to which at least one control value is fed, an optimization of the parameters of the controller can be achieved with the following design stages of an optimizer. An analyzer 11 connected to the control system for analyzing the control output. A simulator of the control system is connected to the analyzer, and an optimizer connected to the simulator for at least one parameter of the controller under given optimizing criteria. A parameter setter is proruded for setting at least the one parameter, which is optimized by the optimizer and determined in the simulating at the controller.

6 Claims, 4 Drawing Sheets

OPTIMIZER FOR A PARAMETER-DEPENDENT NETWORK SYSTEM

BACKGROUND OF THE INVENTION

1. Field of the Invention

The invention relates to an optimizer for a parameter-dependent network system, comprising a plurality of controllers, which are interconnected by means of a network for communicating established input values and which generate control values for a controlled system. Control systems may include controllers whose input values come from the controlled system, so that a closed-loop control circuit is formed. It is, however, also possible that the input values do not come directly from the controlled system, so that an open-loop control system is produced.

2. Discussion of the Related Art

In the simplest case, the parameters of a controller can influence its amplification factors, or the like. For example, it is known to alter the parameters depending on the control output, i.e., based on the results of the control executed, a corrected controller is realized. Such a correction of the controller assumes a determined correlation between the parameter and the controller output. The correction of controllers reaches its limits whenever there is a more complex system in which the controllers are dependent on one another and/or influence one another. In this case, there are as a rule no determinable correlations between the controller output and the parameters. A correction of the parameters is not possible in this case. At best, one can only find suitable parameter combinations by trying them out in test runs of the control system. This is the case, as a rule, in a network.

If one considers, for example, a car as a control system, then it is evident that trying out parameters in test runs is sufficiently complex if the controllers of the engine, the transmission, and the brakes are designed with a communications network. It is, indeed, possible to simulate a network, which tests various parameter combinations, such as the size of the data bus used in the network as well as priority assignments for messages sent on the simulated system. However, this does not produce a reliable specification of an optimum parameter combination for the real system.

In the prior art, attempts have been made to design a network system equally optimal. There are "tools" on the market, which provide assistance in designing such a network system. These tools allow, in a first stage, a simulation of the sequence of communication and control operations in the network in accordance with boundary specifications of the system designer. This simulation is much slower than the real operation, but speed is not relevant to the application purpose. In a second stage, a partial simulation is made with an emulator in a network system which is partially of real design. An emulator of this type can be of realtime design. In the final stage, an analyzer checks the sequence of operations in the real network system assembled. Once the network is assembled, it is possible only with great difficulty to determine whether the parameters assigned to the individual controllers are optimal. For this it is necessary to carry out trials by a process which is hardly systematic. Rather, it can only be carried out in a random manner, due to the large number of possible parameter combinations.

Reference is made to applicant's co-pending application Ser. No. 213,951, filed Jul. 1, 1988, the contents of which are hereby incorporated in this application by reference, particularly with regard to a more detailed description of some of the components of the present invention.

SUMMARY OF THE INVENTION

An object of the invention is to create an optimizer for a parameter-dependent control system of the type mentioned above, which permits optimization of the parameters of the real system.

This object is achieved with an optimizer of the type mentioned, by an apparatus, comprising:

a controller for generating control values for a controlled system;

a network analyzer means connected to the network for receiving and conditioning parameter related signals;

a simulator means connected to the analyzer means; for simulating operation of said controlled system based on said conditioned parameter related signals;

an optimizer means connected to the simulator for optimizing operation of said simulator means according to predetermined optimizer rules; and a parameter setter means responsive to an output of said simulator means for altering the operation of at least one of said controller means to produce optimized operation.

According to the invention, the optimization of the parameter or parameters is carried out with the assistance of an analyzer of the control system and a means of simulating the control system. The analyzer determines the control output which is input into the simulating means of the control system as input data. The optimizer performs an optimization in the simulating means of the control system, so that parameters are available as output information which are input into the real system with a parameter setter. The optimization operation thus runs independently of the real system, but with the data of the real system and with the real system being influenced by the optimized parameters.

It is thus possible, according to the invention, to run the optimization operation in parallel to the real control system, and for it to act upon the real control system directly or indirectly in order to translate the result of optimization into reality. This operation can be repeated in accordance with certain criteria, or run continuously on-line. Accordingly, it is possible to simulate the control system by means of a simulator or a real-time emulator. In the case of the emulator, the input values of the controller are taken entirely or largely from actual measurement sensors or from an analyzer and can be processed in real time, the communications network being thereby simulated. In the case of the simulator, the data generators are also simulated. The simulator cannot work in real time, so that, with the simulator, only repeated optimizations at time intervals are possible.

The optimized parameters can be input into the control system by means of a EPROM burn-in device, for example, which burns the optimized parameters into the EPROMs of the sub-controllers. A particularly elegant solution is, however, to feed the optimized parameters via a communications interface into a communications network, by means of which the new parameters are sent to the respective sub-controllers and used there. However, this message requires an appropriate design of the subcontrollers in the control system.

The invention will be explained in greater detail below with reference to exemplary embodiments diagrammatically illustrated in the drawing.

DETAILED DESCRIPTION OF THE PREFERRED EMBODIMENTS

Figure 1:
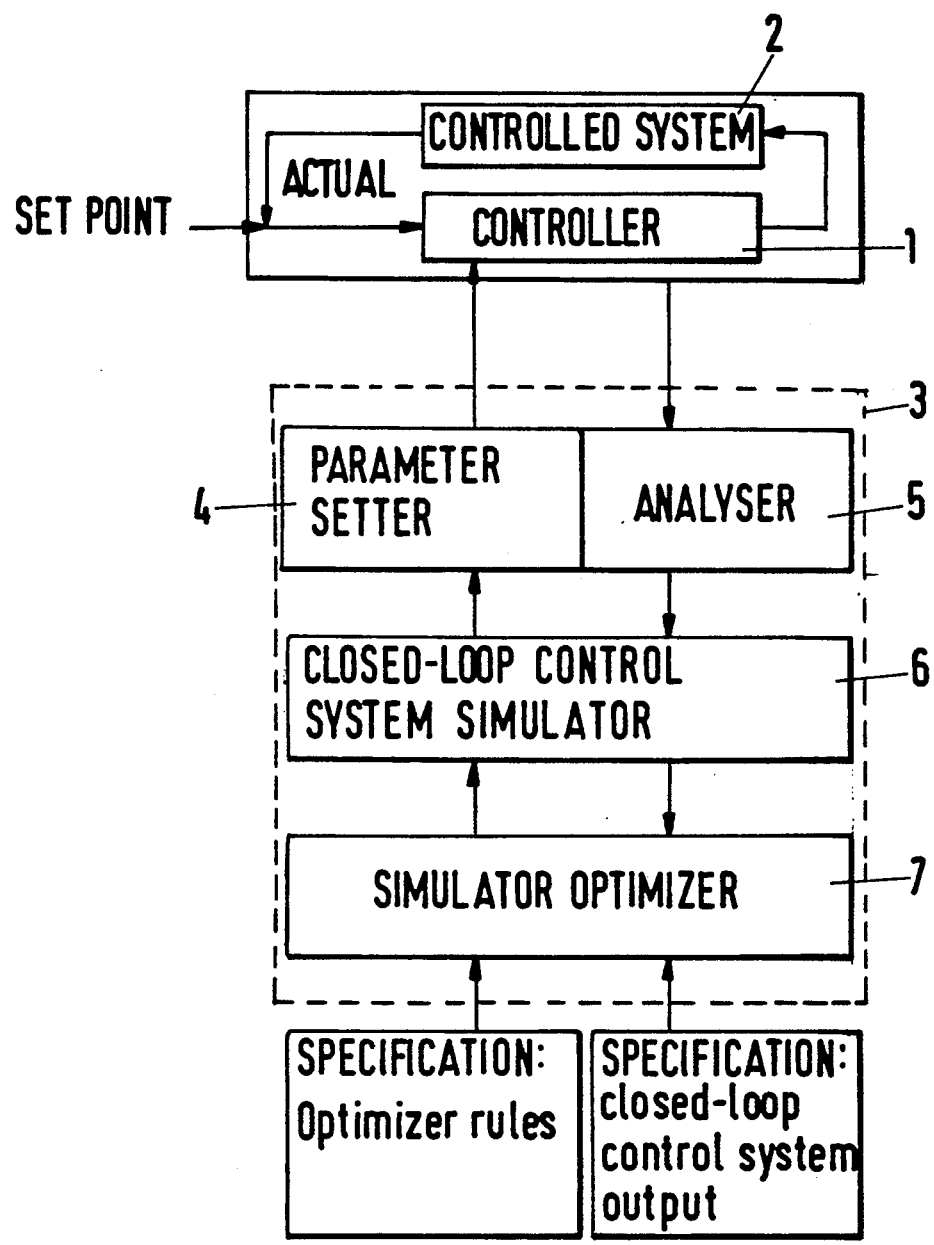
FIG. 1 shows a basic block circuit diagram for an optimizer acting on a closed-loop control system.

FIG. 1 shows a control system comprising a controller a controlled system 2 and an optimizing stage 3. The circuit between controller 1 and controlled system 2 is closed in this exemplary embodiment, so that a closed-loop control system is realized, into which a setpoint value is input and then compared with an actual value of the controlled system. The characteristics of the controller 1 are dependent on the parameters set, which can be supplied to the controller 1 via a parameter setter 4 of the optimizing stage 3. The operating state of the closed-loop control circuit composed of controller 1 and controlled system 2 is obtained for instance using a set of properly placed sensors. The outputs of the sensors are analyzed by an analyzer 5. The analyzer can be, for example, a network analyzer, which is configured so as to output the proper set of variables sometimes referred to as state variables. These variables are input to a simulator 6, which in turn simulates the closed-loop control system composed of controller 1 and controlled system 2 with the boundary conditions established by the analyzer 5.

Connected to the closed-loop control system simulator is a simulator optimizer 7, into which optimizing rules can be input as specifications, and out of which a desired closed-loop control system can be output. According to these optimizing criteria, the simulator optimizer 7 alters the boundary conditions of the simulator 6 until optimum operating has been achieved. The parameters resulting from said operation are forwarded by the closed-loop control system simulator 6 to the parameter setter 4, which alters the parameters of the control stage 1 correspondingly.

The current state of the closed-loop control system is simulated by the analysis of the current state of the closed-loop system composed of control stage 1 and controlled system 2 in the closed-loop control system simulator 6, so that the optimizer 7 can carry out the optimization starting from the current state. After performing the optimization, the parameter setter 4 changes the controller 1 in such a way that the closed-loop control system 1, 2 now functions in an optimized manner.

This operation may be repeated from time to time as desired. If a real-time closed-loop control system simulator 6 in the form of an emulator is employed, it is also possible to carry out such a control on-line.

Figure 2:
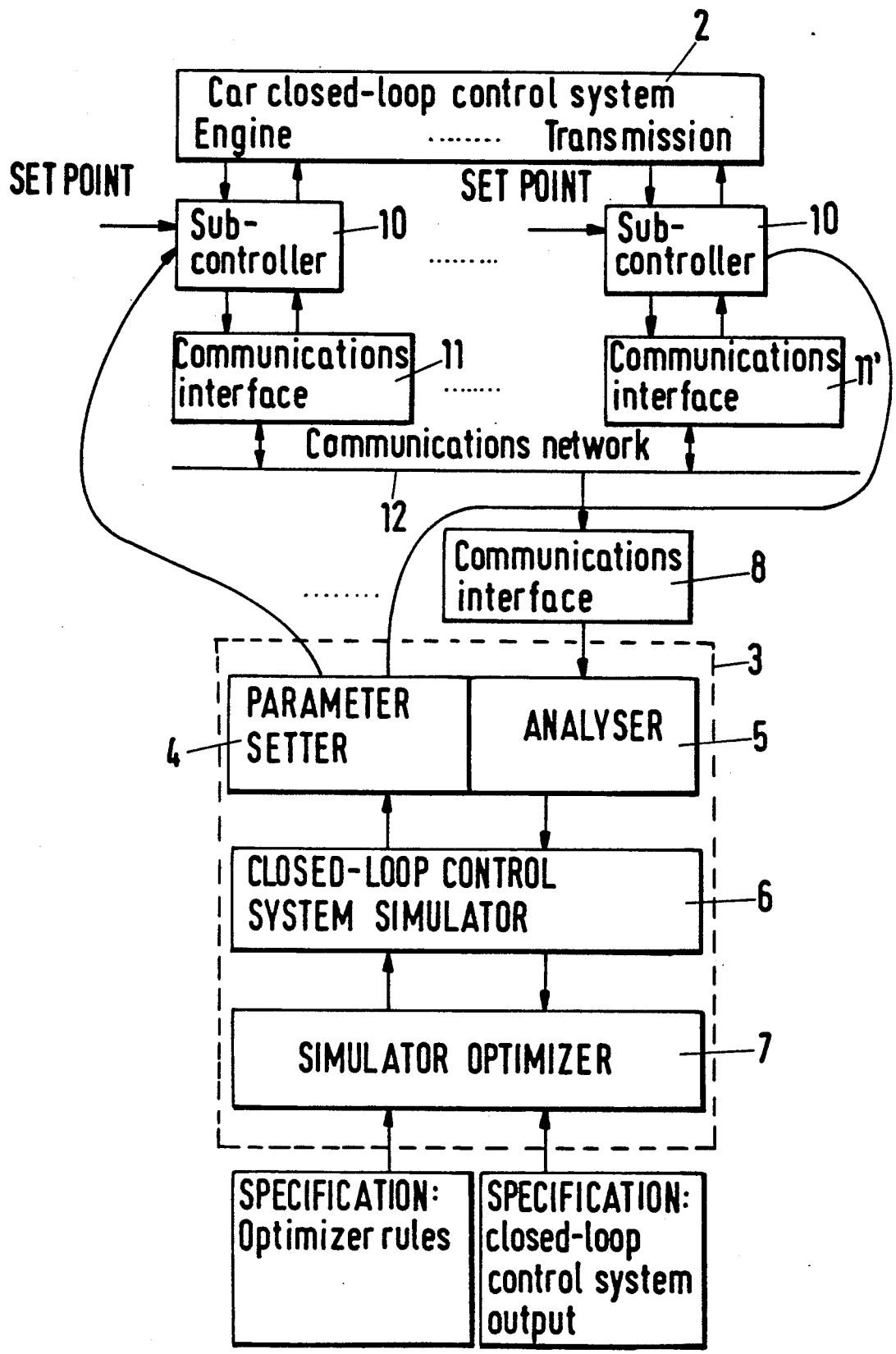
FIG. 2 shows a basic block circuit diagram for an optimizer acting on a plurality of controllers in a network.

In FIG. 2, the optimizing stage 3 is in principle identical to the optimizing stage 3 from FIG. 1. Illustrated, however, is the use of an optimizing stage of this type in a car as the controlled system 2, in which a plurality of sub-controllers 10, 10' act on certain parts of the car control system, such as on the engine and transmission for example. The data taken from there from the sub-controllers travel via an associated communications interface 11, 11' to a communications network 12, so that the controllers 10, 10' can communicate with each other and can influence one another. The sub-controllers 10, 10' process the data received from the controlled system 2, as well as the data sent to them from other sub-controllers 10, 10', and calculate from that the control values which are transmitted to the controlled system 2. For the communication between the controllers 10, 10', the essential point is that the data sent from the controllers 10, 10' to other controllers 10, 10' are available as fast as possible to the other controllers 10, 10' so that complete current data information is available for generating the control values for the controlled system 2.

The sequence of communication operations in the communications network 12 is analyzed by the analyzer 5 via a communications interface 8. Any existing communication bottlenecks, which lead to possible intolerable delays during data transfer, are thereby established. The parameter setter 4 may, therefore, alter, for example, the priorities of transmitting frequencies of regularly sent information, etc. for the sub-controllers 10, 10'.

In the exemplary embodiment illustrated in FIG. 2, the parameter setter 4 acts directly on the sub-controllers 10, 10', in that new data records are burnt into EPROMs of the respective controllers 10, 10' with an EPROM burn-in device, for example.

While the system illustrated in FIG. 2 works automatically on-line, the same function can also be implemented with a separating point between analyzer 5/parameter setter 4 on the one hand. In this arrangement an inserted operator can take, for example, the output data of the analyzer 5 and input them into the closed-loop control system simulator 6 at the appropriate time and, after optimization has been carried out, transmit the output data of the closed-loop control system simulator 6 to the parameter setter 4. The control system illustrated in FIG. 3 otherwise corresponds to the one shown in FIG. 2.

Figure 4:
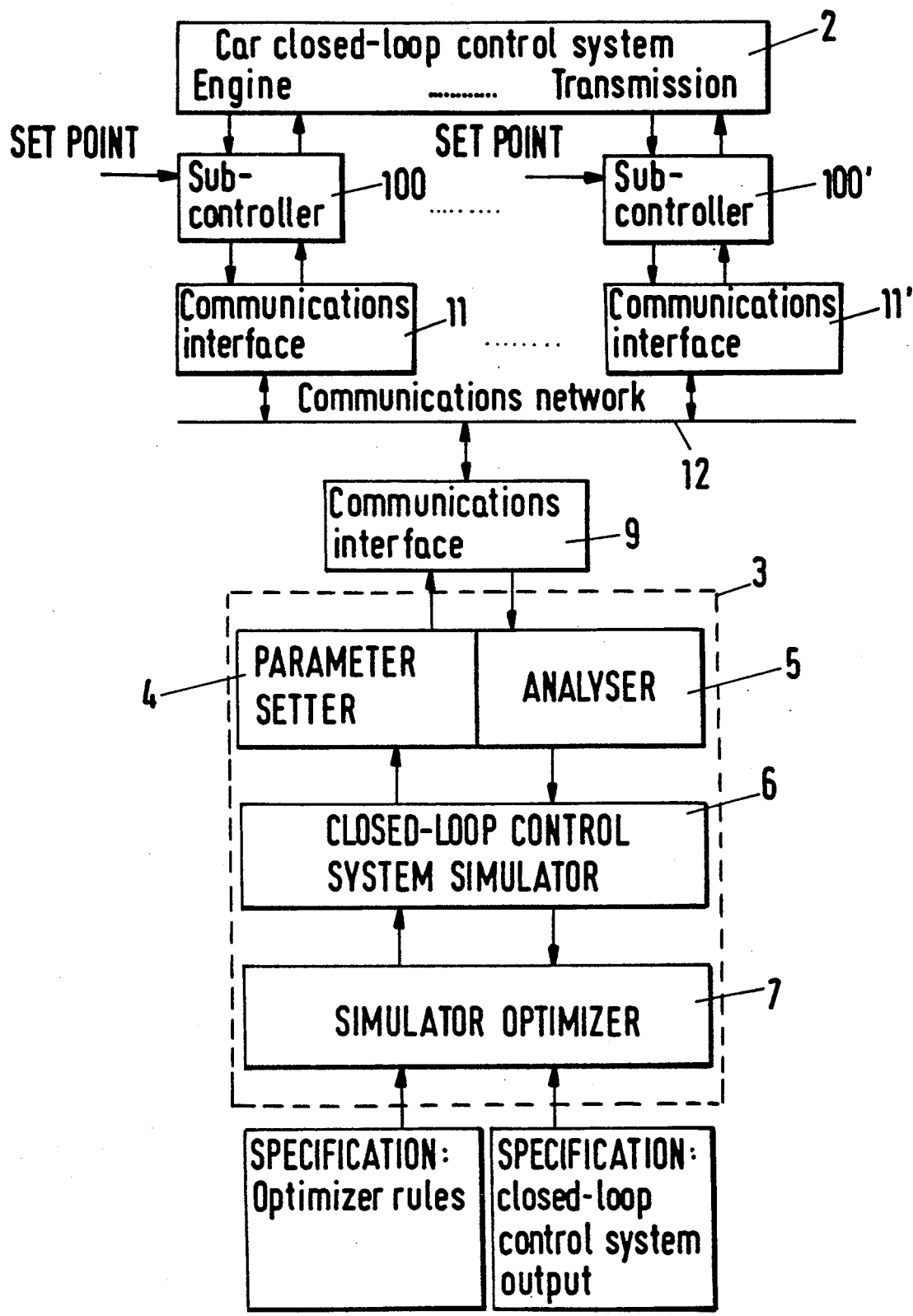
FIG. 4 shows a basic block circuit diagram according to FIG. 2, in which the optimized parameters are transmitted to the controllers via a communications interface and the communications network.

In the control system illustrated in FIG. 4, the communication between the parameter setter 4 and the sub-controllers 100, 100' takes place via a communications interface 9, which also enables communication between the communications network 12 and the analyzer 5. The optimized parameters travel via the communications network 12 and the communications interfaces 11, 11' associated with the sub-controllers 100, 100' to rollers 100, 100', where they are stored as new parameters. The sub-controllers 100, 100' must, therefore, be designed in a way to store these parameters as new operating parameters.

Figure 3:
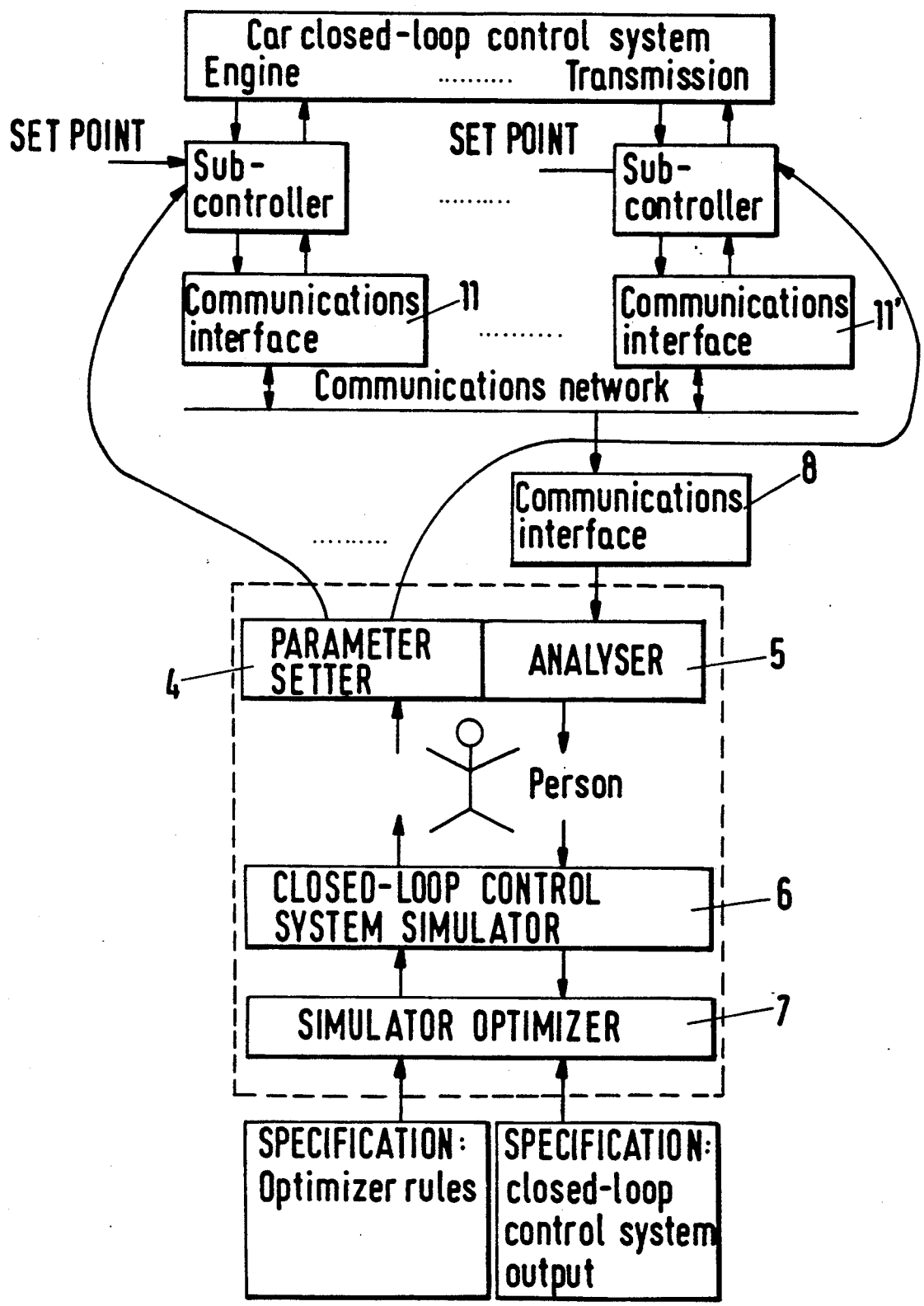
FIG. 3 shows a basic block circuit diagram according to FIG. 2, in which a manual data transmission is provided.

The control system illustrated in FIG. 4 operates elegantly, but has the disadvantage that the optimizing stage 3 cannot be retrospectively connected—as in the exemplary embodiments according to FIGS. 2 and 3—to the communications network 12 without changing the controllers 10, 10', but rather the specially prepared controllers 100, 100' must be used. For new designs of such networks, the use of the controllers 100, 100' permitting communication in accordance with FIG. 4 are certainly advantageous.

What is claimed is:

1. An apparatus comprising:
a network system comprising a number of controllers for generating control values for a controlled system, the communication of said controllers with one another being dependent on the parameters of said network;
an analyzer means connected to the network for analyzing the communication within said network;
simulating means connected to the analyzer means for simulating the communication within the network under varied parameter conditions, the simulating means receiving information about the network from the analyzer means;
an optimizer means connected to said simulating means for optimizing operation of the simulating means by varying said parameters according to predetermined optimizer rules; and
a parameter setter means responsive to an output of said optimizer means for altering the parameters of said controller network system to produce optimized operation; wherein said output of said simulating means being produced after said optimizing operation within said simulating means has been finalized.

2. An apparatus as claimed in claim 1, wherein the analyzer means is a network analyzer which receives inputs from said controller and outputs state variables indicative of an operating state of said controller.

3. An apparatus as claimed in claim 1, wherein the simulating means is a closed loop control system simulator.

4. An apparatus as claimed in claim 1, wherein the simulating means is a real-time emulator.

5. An apparatus as claimed in claim 1, wherein the parameter setter means transmits its setting data to the controller via a communications interface connected to the communications network between the controllers.

6. An apparatus as claimed in claim 1 including a plurality of controllers interconnected by a communication network.

* * * * *